(12) United States Patent
Kato

(10) Patent No.: US 10,025,912 B2
(45) Date of Patent: Jul. 17, 2018

(54) INFORMATION PROCESSING SYSTEM, READING APPARATUS, INFORMATION PROCESSING APPARATUS, AND INFORMATION PROCESSING METHOD

(71) Applicant: KABUSHIKI KAISHA TOSHIBA, Tokyo (JP)

(72) Inventor: Taku Kato, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 173 days.

(21) Appl. No.: 14/944,744

(22) Filed: Nov. 18, 2015

(65) Prior Publication Data

US 2016/0147979 A1    May 26, 2016

(30) Foreign Application Priority Data

Nov. 21, 2014  (JP) ................................. 2014-236757

(51) Int. Cl.
| | |
|---|---|
| G06F 21/00 | (2013.01) |
| G06F 21/10 | (2013.01) |
| H04L 9/08 | (2006.01) |
| G06F 21/72 | (2013.01) |
| G06F 21/60 | (2013.01) |
| G06F 21/12 | (2013.01) |
| G06F 21/62 | (2013.01) |

(52) U.S. Cl.
CPC .......... *G06F 21/10* (2013.01); *G06F 21/123* (2013.01); *G06F 21/602* (2013.01); *G06F 21/6209* (2013.01); *G06F 21/72* (2013.01); *H04L 9/0822* (2013.01); *H04L 9/0844* (2013.01); *G06F 2221/0753* (2013.01)

(58) Field of Classification Search
None
See application file for complete search history.

(56) References Cited

U.S. PATENT DOCUMENTS

| | | | |
|---|---|---|---|
| 6,289,455 B1 * | 9/2001 | Kocher ............... | G06Q 20/367 380/228 |
| 8,417,964 B2 * | 4/2013 | Miyazaki ............... | G06F 21/57 713/189 |
| 2013/0326219 A1 * | 12/2013 | Badam .................... | G09C 1/00 713/168 |

(Continued)

OTHER PUBLICATIONS

"Advanced Access Content System (AACS), Introduction and Common Cryptographic Elements Book", Chapter 4 Additional Procedures for Drive-Host Configurations, Revision 0.953, Oct. 26, 2012, pp. 31-74. Retrieved from http://www.aacsla.com/specifications.

*Primary Examiner* — Eleni A Shiferaw
*Assistant Examiner* — Andrew J Steinle
(74) *Attorney, Agent, or Firm* — Finnegan, Henderson, Farabow, Garrett & Dunner, L.L.P.

(57) ABSTRACT

According to an embodiment, a reading apparatus is connectable with an information processing apparatus connected to a server apparatus. The reading apparatus includes an authenticator, a cryptographic processor, and a transmitter. The authenticator acquires a shared key by performing an authentication/key exchanging process with the server apparatus. The cryptographic processor acquires secret information and encrypts the secret information using the shared key. The transmitter transmits the encrypted secret information to the server apparatus.

7 Claims, 13 Drawing Sheets

(56) References Cited

U.S. PATENT DOCUMENTS

| | | | |
|---|---|---|---|
| 2014/0053230 A1* | 2/2014 | Rodgers | G06F 21/72 726/1 |
| 2015/0006403 A1* | 1/2015 | Shear | G06F 21/10 705/57 |
| 2015/0128243 A1* | 5/2015 | Roux | H04L 9/0877 726/9 |

* cited by examiner

INFORMATION PROCESSING SYSTEM, READING APPARATUS, INFORMATION PROCESSING APPARATUS, AND INFORMATION PROCESSING METHOD

CROSS-REFERENCE TO RELATED APPLICATIONS

This application is based upon and claims the benefit of priority from Japanese Patent Application No. 2014-236757, filed on Nov. 21, 2014; the entire contents of which are incorporated herein by reference.

FIELD

Embodiments described herein relate generally to an information processing system, a reading apparatus, an information processing apparatus, and an information processing method.

BACKGROUND

To decrypt content data encrypted and recorded in a recording medium (encrypted content data) such as digital versatile disc (DVD) or a Blu-ray (registered trademark) disc (BD), a player also reads key data encrypted and recorded in the same recording medium (an encrypted content data key) for decrypting the encrypted content data. The player decrypts the encrypted content data key using another key (device key) concealed inside of the player in advance. The player then decrypts the encrypted content data using the content data key obtained in the previous step.

A disc reading apparatus (drive) is used to read data from a recording medium such as a DVD or BD, and a card reader is used to read data from a memory card such as a SD (registered trademark) memory card. A player may be a piece of software (hereinafter, sometimes referred to as a host) installed in a personal computer (PC), and, in the PC system, the data to be read may require additional protection. For such a case, there is an additional protection technology for encrypting the data before reading the data from a recording medium, using a shared key shared in advance by performing an authentication and key exchange (AKE) process that uses secret information that is kept concealed between the drive (when a recording medium is a BD or a DVD, for example) and the host, or between the SD card and the host. With such a configuration, when the data in the recording medium has already been encrypted, the data will be encrypted again. With such a technology, even if a host obtains the device key illegitimately, the host is prohibited from reading the data, because the host is incapable of executing the AKE process correctly without the secret information required in the AKE process.

The conventional technology is, however, incapable of preventing any host who has illegitimately obtained the secret information used in the AKE process from illegitimately reading the data.

DETAILED DESCRIPTION

According to an embodiment, an information processing system includes a reading apparatus, an information processing apparatus, and a server apparatus. The reading apparatus includes a first authenticator, a first cryptographic processor, a first transmitter, and a reader. The first authenticator acquires a first shared key by performing a first authentication/key exchanging process with the server apparatus. The first cryptographic processor encrypts first secret information using the first shared key. The first transmitter transmits the encrypted first secret information to the server apparatus. The reader reads data from a recording medium. The server apparatus includes a second authenticator, a first receiver, a second cryptographic processor, a determiner, and a second transmitter. The second authenticator acquires the first shared key by performing the first authentication/key exchanging process with the reading apparatus, and acquires a second shared key by performing a second authentication/key exchanging process with the information processing apparatus. The first receiver receives the encrypted first secret information from the reading apparatus. The second cryptographic processor decrypts the encrypted first secret information with the acquired first shared key, and encrypts second secret information that is based on the decrypted first secret information with the second shared key. The determiner determines whether to permit the information processing apparatus to acquire the data read from the recording medium by the reading apparatus for legitimate use of the data. The second transmitter transmits the encrypted second secret information to the information processing apparatus when the determiner determines to permit. The information processing apparatus includes a third authenticator, a second receiver, and a third cryptographic processor. The third authenticator acquires the second shared key by performing the second authentication/key exchanging process with the server apparatus. The second receiver receives the encrypted second secret information from the server apparatus. The third cryptographic processor decrypts the received second secret information using the second shared key.

Various embodiments will be explained below in detail with reference to the accompanying drawings.

First Embodiment

Figure 1:
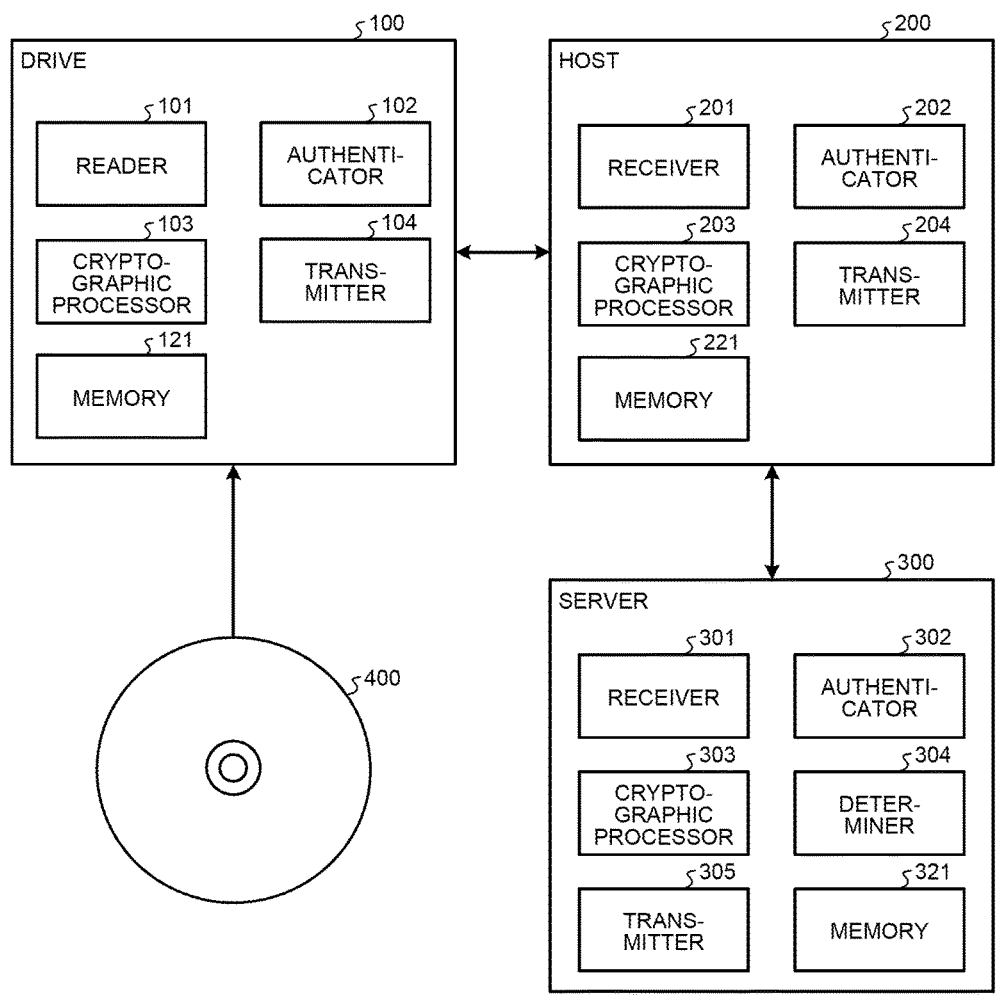
FIG. 1 is a block diagram of an information processing system according to a first embodiment.

FIG. 1 is a block diagram illustrating an example of a functional configuration of an information processing system according to a first embodiment. The information processing system according to the first embodiment includes a drive 100, a host 200, and a server 300. In FIG. 1, each of these devices is illustrated in singularity, but these devices may be provided in plurality.

The drive 100 is a reading apparatus for reading data from a recording medium 400. Explained below is an example in which a DVD or a BD is used as the recording medium 400, and the drive 100 is used as a reading apparatus. In a configuration in which a recording medium is a memory card, a card reader, for example, may be used as the reading apparatus instead of the drive 100. Depending on the type of the recording medium, such as an SD card, the recording medium has the function equivalent to an authenticator 102 and an cryptographic processor 103. In such a case, a combination of a memory card and a reading apparatus such as a card reader, for example, may implement a function equivalent to a combination of the recording medium 400 and the drive 100.

The host 200 accesses the data recorded in the recording medium 400 via the drive 100. The host 200 can be implemented as software operating on an information processing apparatus such as a PC. The host 200 and the drive 100 may be connected to each other in any configuration. For example, the drive 100 may be built in the information processing apparatus, or may be connected externally to an information processing apparatus following a standard connection such as a universal serial bus (USB).

In the first embodiment, the host 200 communicates information of the drive 100 that is to be connected with the host 200 to the server 300. The host 200 is permitted to access data on the recording medium 400 only when the server 300 permits the combination (pairing) of the drive 100 and the host 200 based on the information.

The server 300 is a server apparatus having a function of determining whether the combination of the drive 100 and the host 200 is permitted. The server 300 and the host 200 may be connected to each other in any configuration. For example, the information processing apparatus on which the host 200 operates may be connected to the server 300 over a network such as the Internet.

Functions of each of these apparatuses will now be explained in detail. The drive 100 at least includes a reader 101, an authenticator 102, an cryptographic processor 103, a transmitter 104, and a memory 121.

The memory 121 stores therein various types of information. For example, the memory 121 stores therein secret information (first secret information) generated internally in the drive 100, or that is assigned in advance, information for generating a reading key (K_rd) or the first secret key information, and information for generating the reading key. The reading key is a key used for generating an encryption key (which is described later) for encrypting the data read from the recording medium. The first secret information and the reading key may be generated and stored in the memory 121 or the like in advance, or may be generated by the drive 100 following a predetermined rule. This secret information is information that is different from the secret information used in the AKE process mentioned above.

The reader 101 reads data from the recording medium 400.

The authenticator 102 performs the AKE process (first authentication/key exchanging process) with the server 300, and performs the AKE process (third authentication/key exchanging process) with the host 200. For the AKE process, any conventional scheme may be used, including the "authentication and key sharing mechanism" disclosed in Advanced Access Content System (AACS) Introduction and Common Cryptographic Elements Book, "CHAPTER 4 ADDITIONAL PROCEDURES FOR DRIVE-HOST CONFIGURATIONS," 2012 (available at www.aacsla.com/specifications) (retrieved on Nov. 10, 2014). The authenticator 102 may execute the AKE process with the server 300 and the AKE process with the host 200 using the same scheme (protocol), or different schemes.

In a general AKE process, apparatuses exchange certificates for demonstrating the authenticity of one another in the authentication process. A certificate contains unique identification information (ID) assigned to the apparatus. In the first embodiment, the identification information of the drive 100 included in the certificate is referred to as a drive ID, the identification information of the host 200 is referred to as a host ID and the identification information of the server 300 is referred to as a server ID.

The cryptographic processor 103 encrypts and decrypts various types of information, and generates data such as keys required for encryption and decryption. For example, the cryptographic processor 103 encrypts secret information using the shared key (first shared key) acquired as a result of the AKE process with the server 300. The cryptographic processor 103 also acquires the generated first secret information or the first secret information stored in the memory 121, and generates a pairing reading key from the acquired first secret information and the reading key. The pairing reading key corresponds to an encryption key for encrypting the data read from the recording medium 400. In other words, the cryptographic processor 103 encrypts the data read from the recording medium 400 with the pairing reading key.

The cryptographic processor 103 may generate the keys using any technique or method. The keys may be generated, for example, with a technique in which one or more pieces of information are input to a one-way function, and the output from the one-way function is used as a key. Another exemplary technique is inputting two or more pieces of information, one of which is an encryption key and the remaining is a plaintext, and using the resultant encrypted text that is the output as a key for another cryptographic process. In the example described above, the cryptographic processor 103 uses an output of a one-way function receiving inputs of the secret information and the reading key, as a pairing reading key. An cryptographic processor 203 and an cryptographic processor 303, which will be explained later, may also generate keys using any technique or method.

The transmitter 104 transmits various types of information to external apparatuses including the server 300. For example, the transmitter 104 transmits the first secret information encrypted by the cryptographic processor 103 to the server 300. When the drive is not capable of connecting with the server directly, every piece of data including the encrypted first secret information transmitted by the transmitter 104 is first received by a receiver 201 included in the host 200, and transmitted again from a transmitter 204 to the server.

The host 200 includes the receiver 201, an authenticator 202, an cryptographic processor 203, the transmitter 204, and a memory 221.

The receiver 201 receives various types of information transmitted from external apparatuses including the drive 100 and the server 300. For example, the receiver 201 receives the first secret information described later encrypted by the server 300 from the server 300.

The authenticator 202 performs the AKE process with the server 300 (second authentication/key exchanging process), and the AKE process (third authentication/key exchanging process) with the drive 100. For the AKE process between the host 200 and the server 300, any conventional scheme, such as that disclosed in the document mentioned above, may be used. The authenticator 202 may execute the AKE process with the server 300 and the AKE process with the drive 100 using the same scheme (protocol), or using different schemes.

The cryptographic processor 203 encrypts and decrypts various types of information, and generates data such as keys required for encryption and decryption. For example, the cryptographic processor 203 decrypts the encrypted first secret information received from the server 300 using the shared key (second shared key) acquired as a result of the AKE process with the server 300.

The transmitter 204 transmits various types of information to external apparatuses including the drive 100 and the server 300. For example, the transmitter 204 transmits a pairing request to the server 300. A pairing request is a request for permission for combining (pairing) the host 200 with the drive 100. Once the pairing is permitted, information required for reading data from the drive 100 can be acquired in advance. The transmitter 204 also transmits a request for reading data to the drive 100.

The memory 221 stores therein various types of information. For example, the memory 221 stores therein the identification information of the drive 100 (drive ID) acquired as a result of the AKE process (third authentication/key exchanging process), and information required for reading the data from the drive 100, received from the server.

The server 300 includes a receiver 301, an authenticator 302, an cryptographic processor 303, a determiner 304, a transmitter 305, and a memory 321.

The memory 321 stores therein various types of information. For example, the memory 321 stores therein the identification information of the drive 100 (drive ID), and the identification information of the host 200 (host ID) acquired as results of the AKE processes.

The receiver 301 receives various types of information transmitted from external apparatuses including the drive 100 and the host 200. For example, the receiver 301 receives the encrypted first secret information from the drive 100.

The authenticator 302 performs the AKE process with the drive 100 (first authentication/key exchanging process), and the AKE process with the host 200 (second authentication/key exchanging process).

The cryptographic processor 303 generates data such as information required for encrypting and decrypting various types of information, and for reading the data from the drive 100. For example, the cryptographic processor 303 decrypts the encrypted first secret information using the shared key (first shared key) acquired as a result of the AKE process with the drive 100. The cryptographic processor 303 also encrypts the secret information (second secret information) that is based on the decrypted first secret information using the shared key (second shared key) acquired as a result of the AKE process with the host 200. In the first embodiment, the decrypted first secret information (first secret information) is used as the second secret information.

The determiner 304 determines whether the combination (pairing) of the drive 100 and the host 200 is permitted. Permission of pairing represents permitting the host 200 to acquire the data read from the recording medium 400 by the drive 100 for legitimate use of the data, for example. If the same host 200 (the host 200 with the same host ID) issues requests for pairing with different drives 100 (drives 100 with different drive IDs) by a number of times exceeding a predetermined number, the determiner 304 determines that the pairing of the host 200 is not to be permitted. In this manner, the data can be protected against being read from drives illegitimately when many copies of the illegitimate host with the same host ID are distributed and used in a manner connected with different drives.

The determination method and the condition used in the determination by the determiner 304 are not limited to the examples described above. Furthermore, the information used in the determination is not limited to the identification information (the drive ID or the host ID). Any method, condition, and information may be used as long as at least one of the drive 100 and the host 200 can be determined to be illegitimate. For example, the determiner 304 may determine that the host 200 is an illegitimate host by referring to the address information (e.g., an internet protocol (IP) address) of the host 200 acquired as a result of the AKE process or any other process.

The transmitter 305 transmits various types of information to external apparatuses including the drive 100 and the host 200. For example, when pairing is permitted, the transmitter 305 transmits the encrypted first secret information to the host 200 for which pairing is permitted.

The cryptographic processor 303 may encrypt the first secret information with the second shared key and the transmitter 305 may transmit the encrypted first secret information only if the pairing is permitted. Alternatively, the cryptographic processor 303 may encrypt the secret information with the second shared key regardless of whether the pairing is permitted, and the transmitter 305 may transmit the encrypted first secret information only if the pairing is permitted. In other words, at least the transmission of the encrypted first secret information to the host should be permitted only if the pairing is permitted.

The memories (the memories 121, 221, 321) described above may be any storage medium commonly used, such as a hard disk drive (HDD), an optical disc, a memory card, and a random access memory (RAM).

Figure 2:
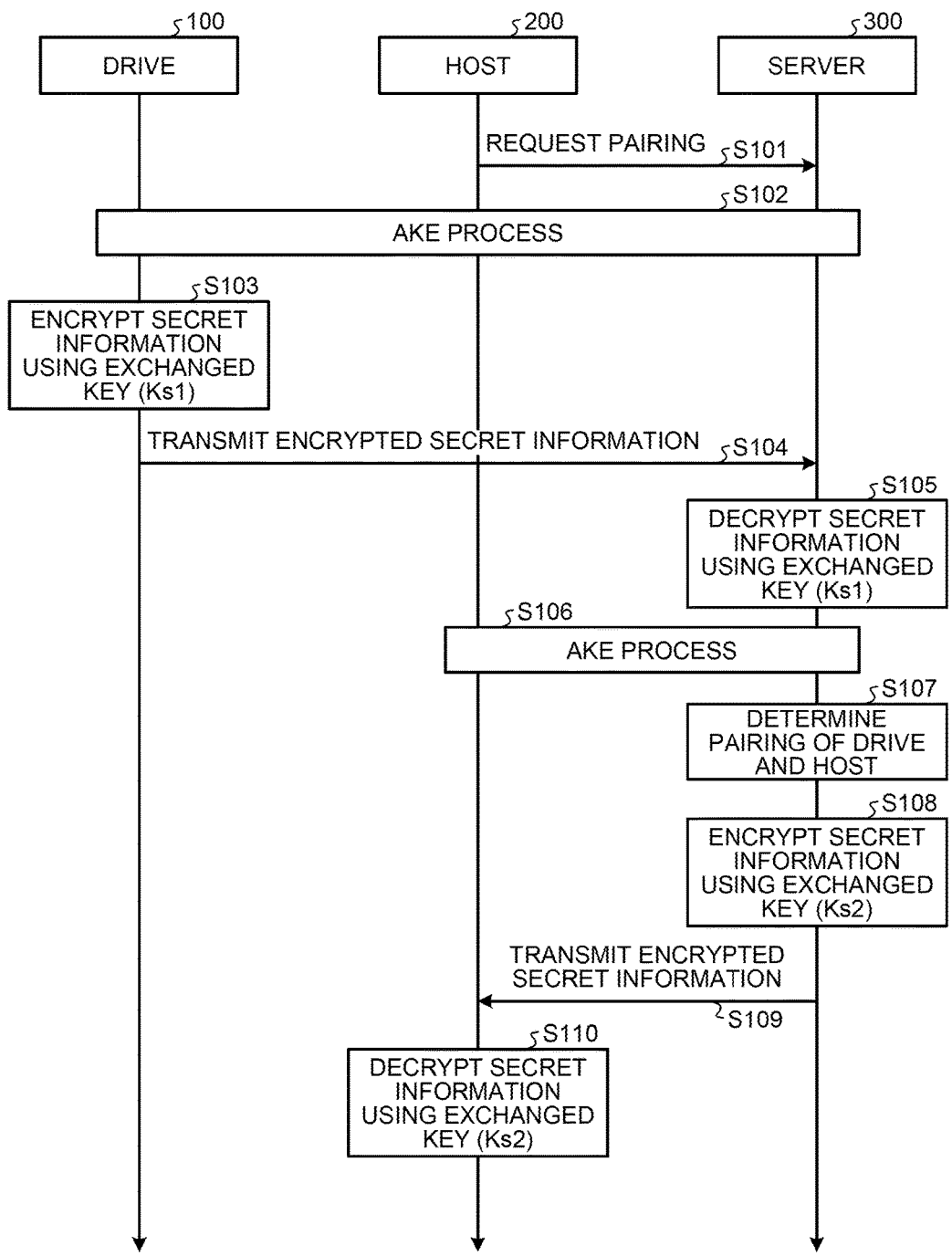
FIG. 2 is a flowchart of a secret information acquiring process according to the first embodiment.

Explained now with reference to FIG. 2 is a secret information acquiring process performed in the information processing system according to the first embodiment with the configuration described above. FIG. 2 is a flowchart illustrating an example of the secret information acquiring process according to the first embodiment. The secret information acquiring process is a process performed by the host 200 before a data reading process, for example, to acquire the secret information (first secret information) required for reading data from the drive 100 with which the host 200 wishes to be paired.

In the secret information acquiring process, the host 200 requests the server 300 from a permission for pairing with the drive 100 that is to be used by the host 200 to read data from the recording medium 400. The server 300 executes the AKE process with the drive 100, and acquires first secret information of the drive 100. The host 200 then executes the AKE process with the server 300, and receives the first secret information of the drive 100 from the server 300.

When the drive 100 does not have a function to communicate directly with the server 300, some equipment (or software) capable of communicating with both of the drive 100 and the server 300 needs to assist the exchange of data required in the secret information acquiring process, without modifying the data. For example, the host 200 requesting the pairing may assist the exchange of data. Let us assume herein that, as an example, the drive 100 is connected with the host 200 via USB, and the host 200 is connected with the server 300 over the Internet. In such a configuration, the host 200 transfers the data received as a USB command from the drive 100 to the server 300, after replacing the USB command with an IP command. The host 200 also transfers the data that is received from the server 300 as an IP command to the drive 100 after replacing the IP command with a USB command.

The equipment or the software assisting exchange of data is not limited to the host 200. For example, some software other than the host 200 operating on the information processing apparatus may have the function for assisting the data exchange.

The secret information acquiring process illustrated in FIG. 2 will now be explained in detail. To begin with, the host 200 connects to the drive 100 pairing with which is required (not illustrated).

The transmitter 204 in the host 200 then sends a pairing request to the server 300 (Step S101). The pairing request may include information for identifying the drive 100 (e.g., a drive ID).

The authenticator 302 in the server 300 receiving the pairing request performs the AKE process with the drive 100 (Step S102). As a result of this AKE process, the drive 100 and the server 300 acquires a first shared key Ks1. The server 300 stores the identification information of the drive 100 (drive ID) acquired as a result of the AKE process in the memory 321, for example.

The cryptographic processor 103 in the drive 100 encrypts the first secret information (Seed_pair) that is generated locally by the cryptographic processor 103 or have been assigned and stored in advance, using the first shared key Ks1 (Step S103). The transmitter 104 in the drive 100 transmits the encrypted first secret information to the server 300 (Step S104).

The cryptographic processor 303 in the server 300 acquires the first secret information (Seed_pair) by decrypting the encrypted first secret information using the first shared key Ks1 exchanged in the AKE process (Step S105).

The host 200 and the server 300 then perform the AKE process, and both acquire a second shared key Ks2 (Step S106). The server 300 stores the identification information of the host 200 (host ID) acquired as a result of the AKE process in the memory 321, for example.

The determiner 304 in the server 300 then determines whether the combination of the drive ID and the host ID is permitted (Step S107). If the combination is permitted, the process is shifted to Step S108. If not, the determiner 304 sends information indicating that the combination is not permitted to the host 200, as required, without performing the subsequent process.

If the combination is permitted, the cryptographic processor 303 in the server 300 encrypts the first secret information (Seed_pair), using the second shared key Ks2 (Step S108). The transmitter 305 in the server 300 then transmits the encrypted first secret information to the host 200 (Step S109).

The cryptographic processor 203 in the host 200 then acquires the first secret information (Seed_pair) by decrypting the encrypted first secret information using the second shared key Ks2 (Step S110), and stores the acquired first secret information (Seed_pair) in the memory 221, for example.

Once the preliminary process described above is completed, the host 200 can actually read the data from the recording medium 400 via the drive 100. The order at which the steps described above are executed is not limited to that illustrated in FIG. 2, and the steps may be ordered differently, or those that can be executed in parallel may be performed in parallel (simultaneously).

Figure 3:
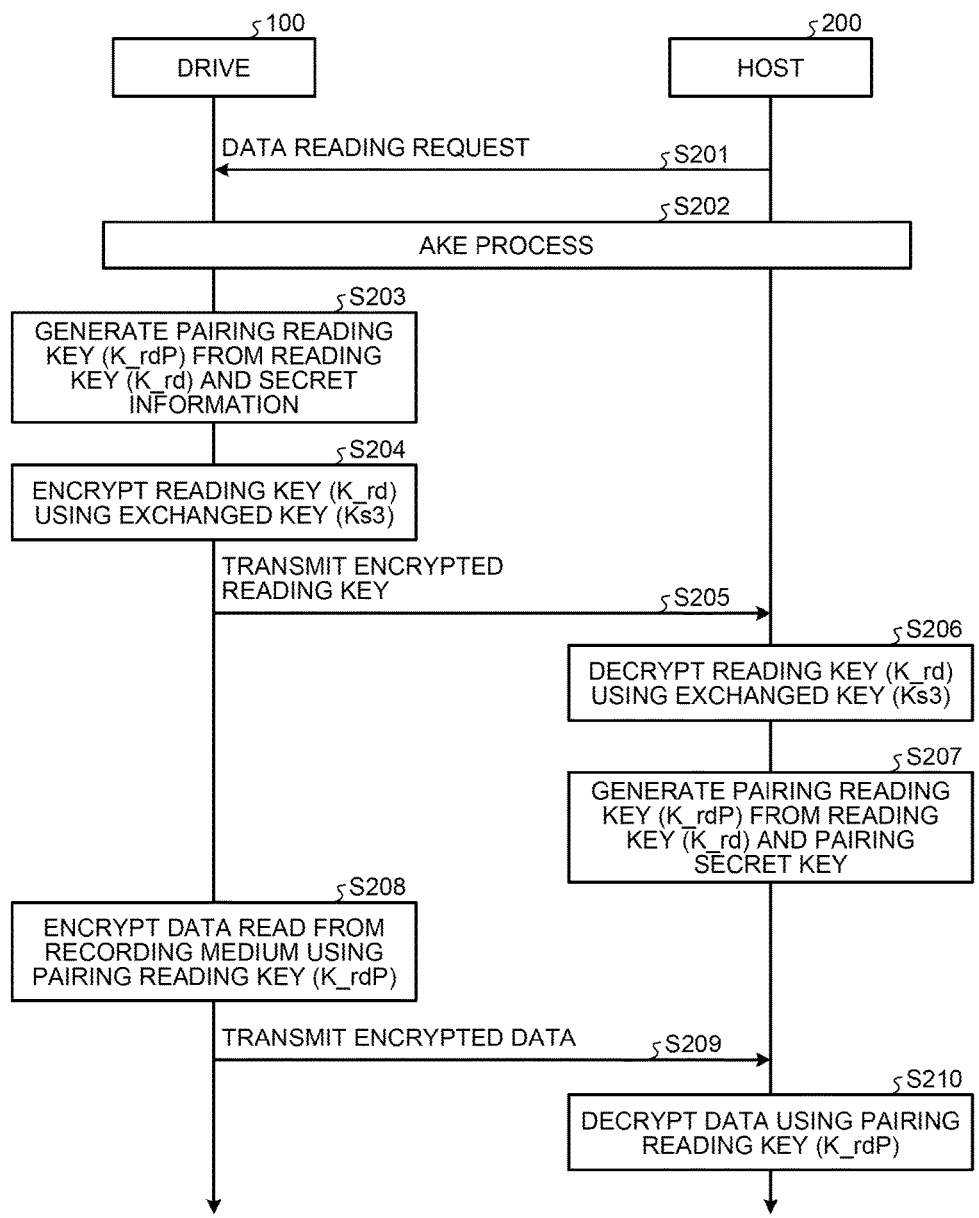
FIG. 3 is a flowchart of a reading process according to the first embodiment.

A process in which the host 200 reads data from the recording medium 400 via the drive 100 will now be explained. FIG. 3 is a flowchart illustrating an example of a reading process according to the first embodiment. The host 200 connects to the drive 100 pairing with which is required (not illustrated).

The transmitter 204 in the host 200 transmits a data reading request to the drive 100 (Step S201). The authenticator 202 in the host 200 performs the AKE process with the authenticator 102 in the drive 100 (Step S202). As a result of this AKE process, the drive 100 and the host 200 acquire a third shared key Ks3.

The cryptographic processor 103 in the drive 100 generates a pairing reading key (K_rdP), which is to be used in transmitting the data in the recording medium 400 to the host 200, from the first secret information (Seed_pair) and the reading key (K_rd) (Step S203).

The cryptographic processor 103 in the drive 100 encrypts the reading key (K_rd) using the third shared key Ks3 (Step S204). The transmitter 104 in the drive 100 then transmits the encrypted reading key to the host 200 (Step S205).

The cryptographic processor 203 in the host 200 acquires the reading key (K_rd) by decrypting the encrypted reading key using the third shared key Ks3 (Step S206). The cryptographic processor 203 then generates the pairing reading key (K_rdP) from the first secret information (Seed_pair) acquired as a result of the secret information acquiring process in advance, and the acquired reading key (K_rd) (Step S207). The cryptographic processor 203 generates the pairing reading key at Step S207 using the same method with which the cryptographic processor 103 in the drive 100 generates the pairing reading key at Step S203.

The cryptographic processor 103 in the drive 100 encrypts the data read from the recording medium 400 using the generated pairing reading key (K_rdP) (Step S208). The transmitter 104 then transmits the encrypted data to the host 200 (Step S209).

The cryptographic processor 203 in the host 200 acquires the data recorded in the recording medium 400 by decrypting the encrypted data using the pairing reading key (K_rdP) generated locally by the cryptographic processor 203 (Step S210).

Through the process described above, the host 200 reads the data in the recording medium 400 via the drive 100 recognized and permitted by the server 300. If no permission is received from the server 300, the host 200 cannot decrypt the encrypted data received from the drive 100. The order at which the steps described above are executed is not limited to that illustrated in FIG. 3, and the steps may be ordered differently, or those that can be executed in parallel may be performed in parallel (simultaneously).

The reading key (K_rd) may be generated locally on the drive 100, as well as may be stored in the memory 121 in advance. Explained herein is an exemplary method with which the drive 100 generates the reading key (K_rd). The drive 100 (for example, the cryptographic processor 103) generates a reading key (K_rd) using at least one of the identification information of the drive 100 (drive ID) stored locally in the drive 100 and the identification information of the host 200 (host ID) acquired as a result of the AKE process, and using the information stored in advance in the memory 121, for example. The information stored in advance in the memory 121 is generated and recorded using a random number generator or the like during the production process of the drive 100. The drive 100 may also generate the first secret information every time the first secret information is requested.

In the manner described above, in information processing system according to the first embodiment, without the permission of the server, a host cannot acquire the first secret information of the drive to be used in reading the data, the first secret information being different from the secret information used in the AKE process, and therefore, cannot read the data from the recording medium. Hence, a host illegitimately having obtained the secret information that is to be used in the AKE process is prohibited from reading of the data illegitimately. Furthermore, a server can determine whether a combination is permitted during the process executed before the data is actually read (reading process) (secret information acquiring process). Therefore, an illegitimate access can be avoided more quickly, compared with that conventionally possible.

Second Embodiment

In the first embodiment, the first secret information generated by or stored in the drive is used as the second secret information as it is. With this method, however, there are cases in which a host who has obtained the first secret information illegitimately cannot be prevented from reading data from the recording medium.

Therefore, an information processing system according to a second embodiment uses information (pairing secret key) as the second secret information generated from the first secret information and the identification information of the host (host ID). Such a configuration can prevent any host who does not have the correct identification information (host ID) from reading data from the recording medium.

Figure 4:
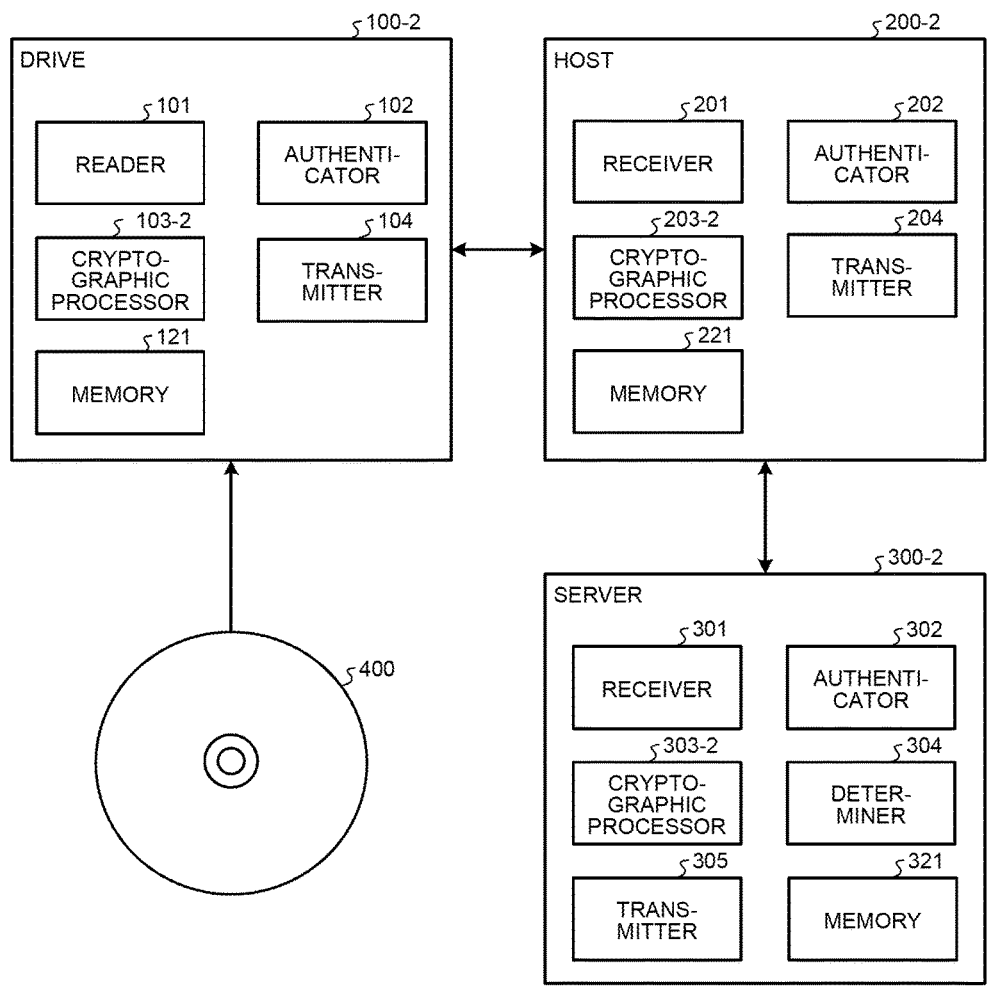
FIG. 4 is a block diagram of an information processing system according to a second embodiment.

FIG. 4 is a block diagram illustrating an example of a functional configuration of the information processing system according to the second embodiment. The information processing system according to the second embodiment includes a drive 100-2, a host 200-2, and a server 300-2.

In the second embodiment, the functions of the cryptographic processor 103-2 in the drive 100-2, the cryptographic processor 203-2 in the host 200-2, and the cryptographic processor 303-2 in the server 300-2 are different from the corresponding functions in the first embodiment. The other elements and functions are the same as those illustrated in the block diagram of the information processing system according to the first embodiment in FIG. 1, so those elements are assigned with the same reference numerals, and explanations thereof are omitted herein.

The cryptographic processor 103-2 is different from the cryptographic processor 103 according to the first embodiment in at least having the following function. The cryptographic processor 103-2 generates a pairing secret key (corresponding to the second secret information) from secret information (first secret information) generated by or stored in the drive 100-2, and from the identification information (host ID) of the host 200-2. The cryptographic processor 103-2 generates the pairing reading key based on the reading key and the pairing secret key.

The cryptographic processor 203-2 is different from the cryptographic processor 203 according to the first embodiment in at least having the following function. The cryptographic processor 203-2 generates the pairing reading key based on the reading key and the pairing secret key. The cryptographic processor 203-2 can decrypt the encrypted reading key using a shared key (third shared key) acquired as a result of the AKE process with the drive 100-2. The cryptographic processor 203-2 decrypts the encrypted data received from the drive 100-2 using the generated pairing reading key.

The cryptographic processor 303-2 is different from the cryptographic processor 303 according to the first embodiment in at least having the following function. The cryptographic processor 303-2 generates a pairing secret key from the decrypted secret information (first secret information) and the identification information (host ID) of the host 200-2. The cryptographic processor 303-2 encrypts the generated pairing secret key using shared key (second shared key) acquired as a result of the AKE process with the host 200-2.

Figure 5:
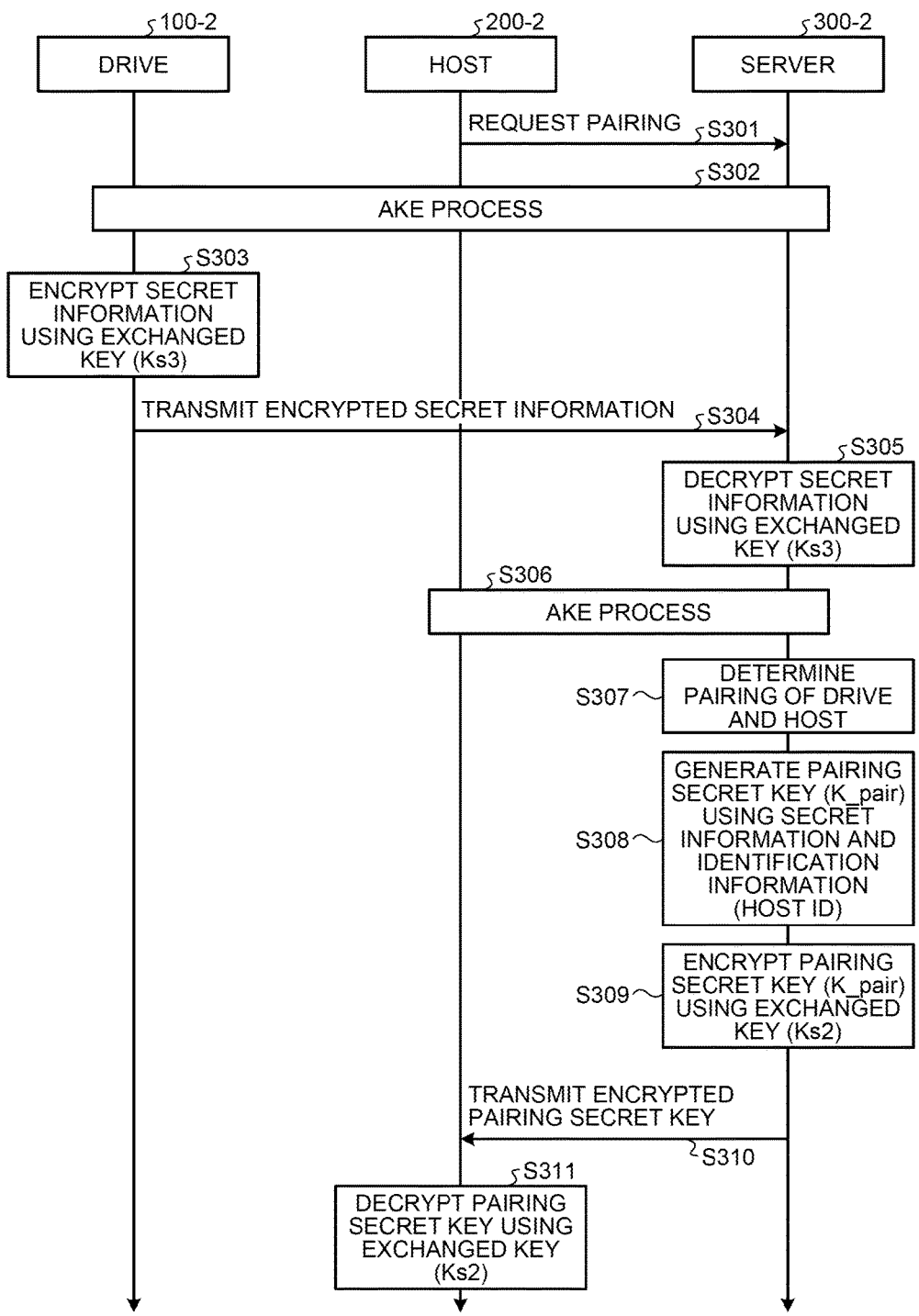
FIG. 5 is a flowchart of a secret information acquiring process according to the second embodiment.

Explained now with reference to FIG. 5 is a secret information acquiring process performed in the information processing system according to the second embodiment with the configuration described above. FIG. 5 is a flowchart illustrating an example of the secret information acquiring process according to the second embodiment.

Because the process from Step S301 to Step S307 is similar to that from Step S101 to Step S107 in the secret information acquiring process according to the first embodiment (FIG. 2), the explanation thereof is omitted herein.

If the combination is permitted, the cryptographic processor 303-2 in the server 300-2 generates a pairing secret key (K_pair) from the first secret information (Seed_pair) and the host ID (Step S308). The cryptographic processor 303-2 then encrypts the generated pairing secret key (K_pair) using the second shared key Ks2 (Step S309). The transmitter 305 in the server 300-2 transmits the encrypted pairing secret key to the host 200-2 (Step S310).

The cryptographic processor 203-2 in the host 200-2 acquires the pairing secret key (K_pair) by decrypting the encrypted pairing secret key using the second shared key Ks2 (Step S311).

Once the preliminary process described above is completed, the host 200-2 can actually read the data from the recording medium 400 via the drive 100-2. The order at which the steps described above are executed is not limited to that illustrated in FIG. 5, and the steps may be ordered differently, or those that can be executed in parallel may be performed in parallel (simultaneously).

Figure 6:
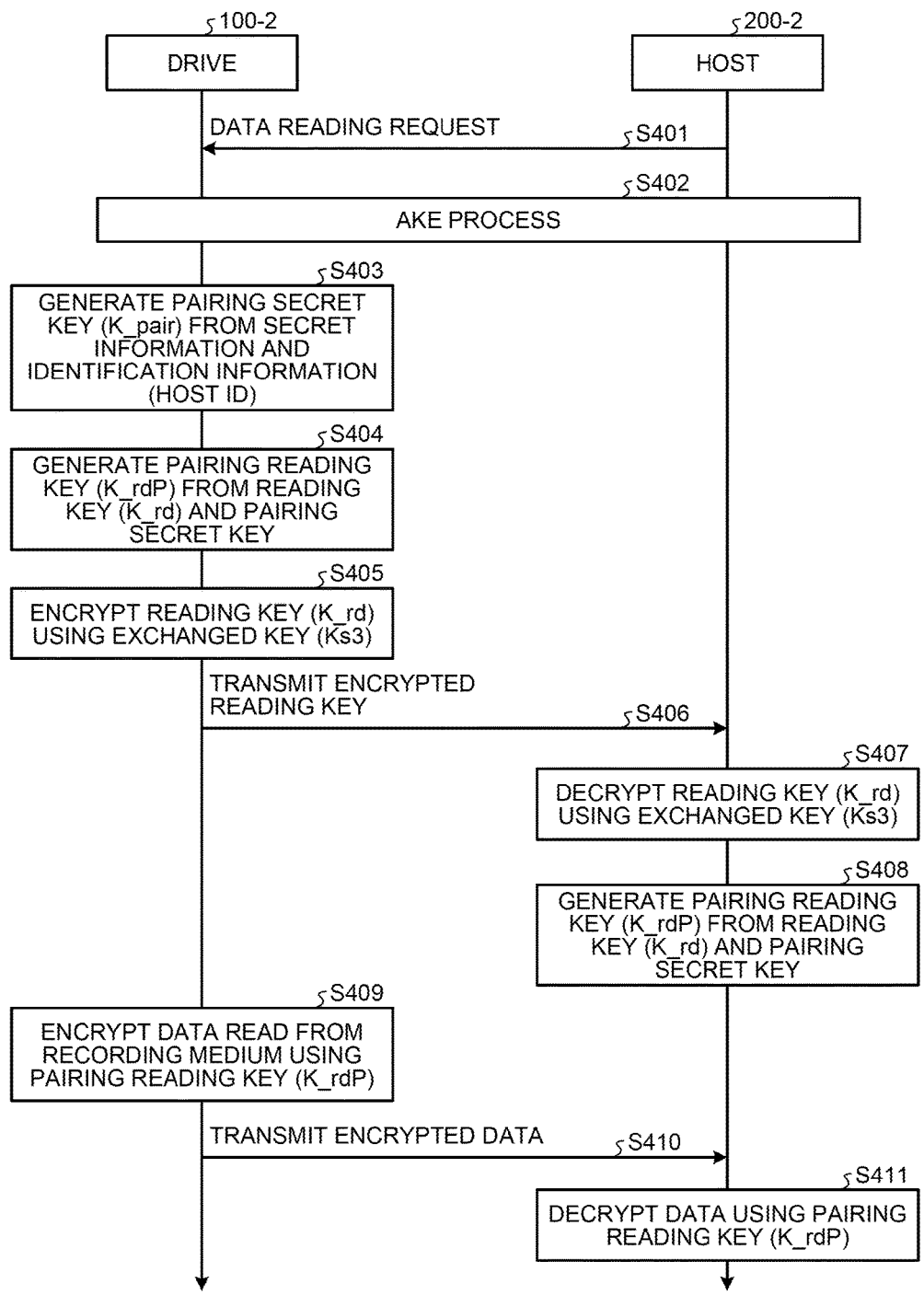
FIG. 6 is a flowchart of a reading process according to the second embodiment.

A reading process in which the data is read from the recording medium 400 via the drive 100-2 will now be explained. FIG. 6 is a flowchart illustrating an example of a reading process according to the second embodiment. The host 200-2 connects to the drive 100-2 pairing with which is required (not illustrated).

Because the process from Step S401 to Step S402 is similar to that from Step S201 to Step S202 in the reading process according to the first embodiment (FIG. 3), the explanation thereof is omitted herein.

The cryptographic processor 103-2 in the drive 100-2 generates a pairing secret key (K_pair) from the first secret information (Seed_pair) and the host ID (Step S403). The cryptographic processor 103-2 generates a pairing secret key at Step S403 following the same method as that used when the cryptographic processor 303-2 in the server 300-2 generates the pairing secret key at Step S308.

The cryptographic processor 103-2 in the drive 100-2 generates a pairing reading key (K_rdP) from the pairing secret key (K_pair) and the reading key (K_rd) (Step S404).

Because the process from Step S405 to Step S407 is the same as that from Step S204 to Step S206 in the reading process according to the first embodiment (FIG. 3), the explanation thereof is omitted herein.

The cryptographic processor 203-2 in the host 200-2 generates a pairing reading key (K_rdP) from the pairing secret key (K_pair) acquired in advance in the secret information acquiring process and the acquired reading key (K_rd) (Step S408). The cryptographic processor 203-2 generates the pairing reading key at Step S408 following the same method as that used when the cryptographic processor 103-2 in the drive 100-2 generates the pairing reading key at Step S403.

Because the process from Step S409 to Step S411 is the same as that from Step S208 to Step S210 in the reading process according to the first embodiment (FIG. 3), the explanation thereof is omitted herein.

Through the process described above, the host 200-2 reads the data stored in the recording medium 400 via the drive 100-2 recognized and permitted by the server 300-2. If no permission is received from the server 300-2, the host 200-2 cannot decrypt the encrypted data received from the drive 100-2. The order at which the steps described above are executed is not limited to that illustrated in FIG. 6, and the steps may be ordered differently, or those that can be executed in parallel may be performed in parallel (simultaneously).

Third Embodiment

In the second embodiment, the information (pairing secret key) generated from the first secret information and the identification information of the host (host ID) is used as the second secret information. An information processing system according to a third embodiment uses information (pairing secret key) generated from the identification information of the drive (drive ID), as well as the first secret information and the identification information of the host (host ID), as second secret information. With such information, it is possible to prevent a host who has been illegitimately authenticated using a drive prepared illegitimately or a host the pairing of which is permitted illegitimately from reading the data from the recording medium.

Figure 7:
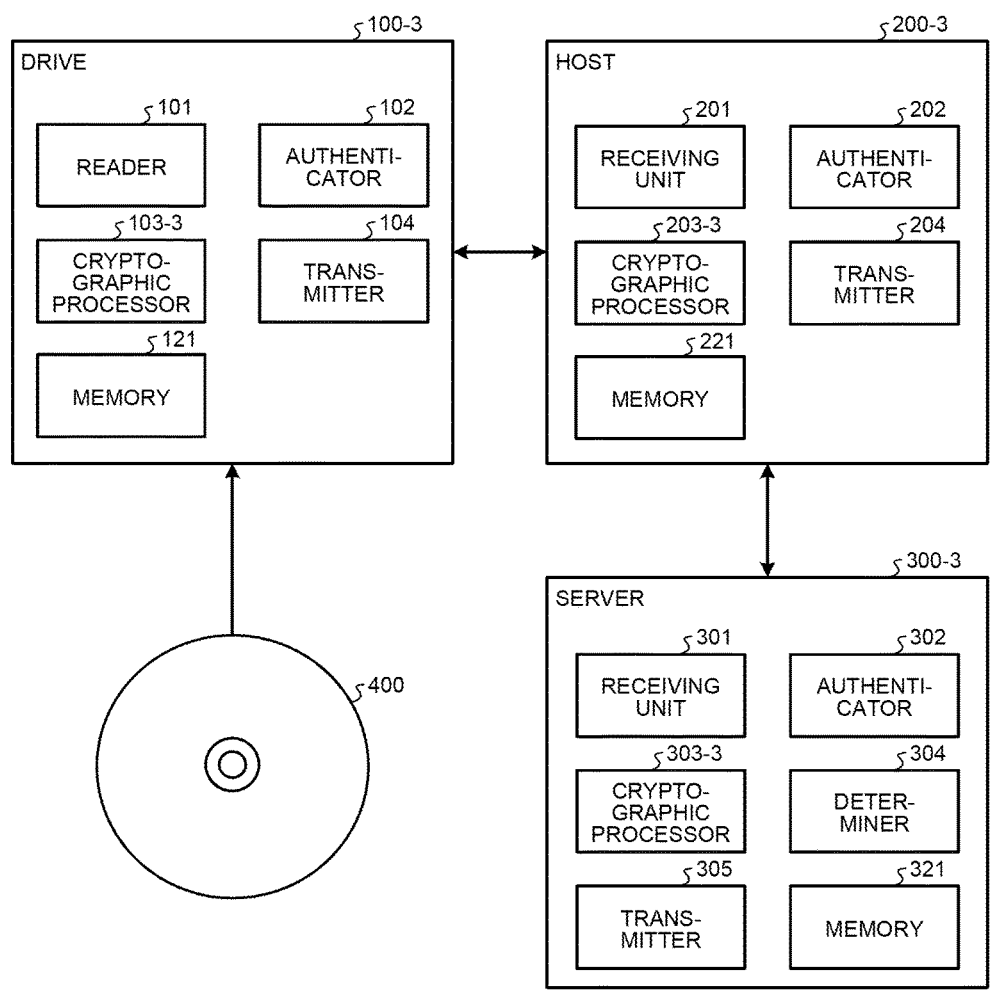
FIG. 7 is a block diagram of an information processing system according to a third embodiment.

FIG. 7 is a block diagram illustrating an example of a functional configuration of the information processing system according to the third embodiment. The information processing system according to the third embodiment includes a drive 100-3, a host 200-3, and a server 300-3.

In the third embodiment, functions of the cryptographic processor 103-3 in the drive 100-3, the cryptographic processor 203-3 in the host 200-3, and the cryptographic processor 303-3 in the server 300-3 are different from corresponding functions in the first embodiment. The other elements and functions are the same as those illustrated in the block diagram of the information processing system according to the first embodiment in FIG. 1, so those elements are assigned with the same reference numerals, and explanations thereof are omitted herein.

The cryptographic processor 103-3 is different from the cryptographic processor 103 according to the first embodiment in at least having the following function. The cryptographic processor 103-3 generates the pairing secret key (corresponding to the second secret information) from the secret information (first secret information) generated by or stored in the drive 100-3, the identification information (host ID) of the host 200-3, and the identification information (drive ID) of the drive 100-3. The cryptographic processor 103-3 generates the pairing reading key based on the reading key and the pairing secret key.

The cryptographic processor 203-3 is different from the cryptographic processor 203 according to the first embodiment in at least having the following function. The cryptographic processor 203-3 generates the pairing reading key based on the reading key and the pairing secret key. The cryptographic processor 203-3 can decrypt the encrypted reading key using a shared key (third shared key) acquired as a result of the AKE process performed with the drive 100-3. The cryptographic processor 203-3 decrypts the encrypted data received from the drive 100-3, using the generated pairing reading key.

The cryptographic processor 303-3 is different from the cryptographic processor 303 according to the first embodiment in at least having the following function. The cryptographic processor 303-3 generates a pairing secret key from the decrypted secret information (first secret information), the identification information (host ID) of the host 200-3, and the identification information (drive ID) of the drive 100-3. The cryptographic processor 303-3 encrypts the generated pairing secret key with the shared key (second shared key) acquired as a result of the AKE process performed with the host 200-3.

Figure 8:
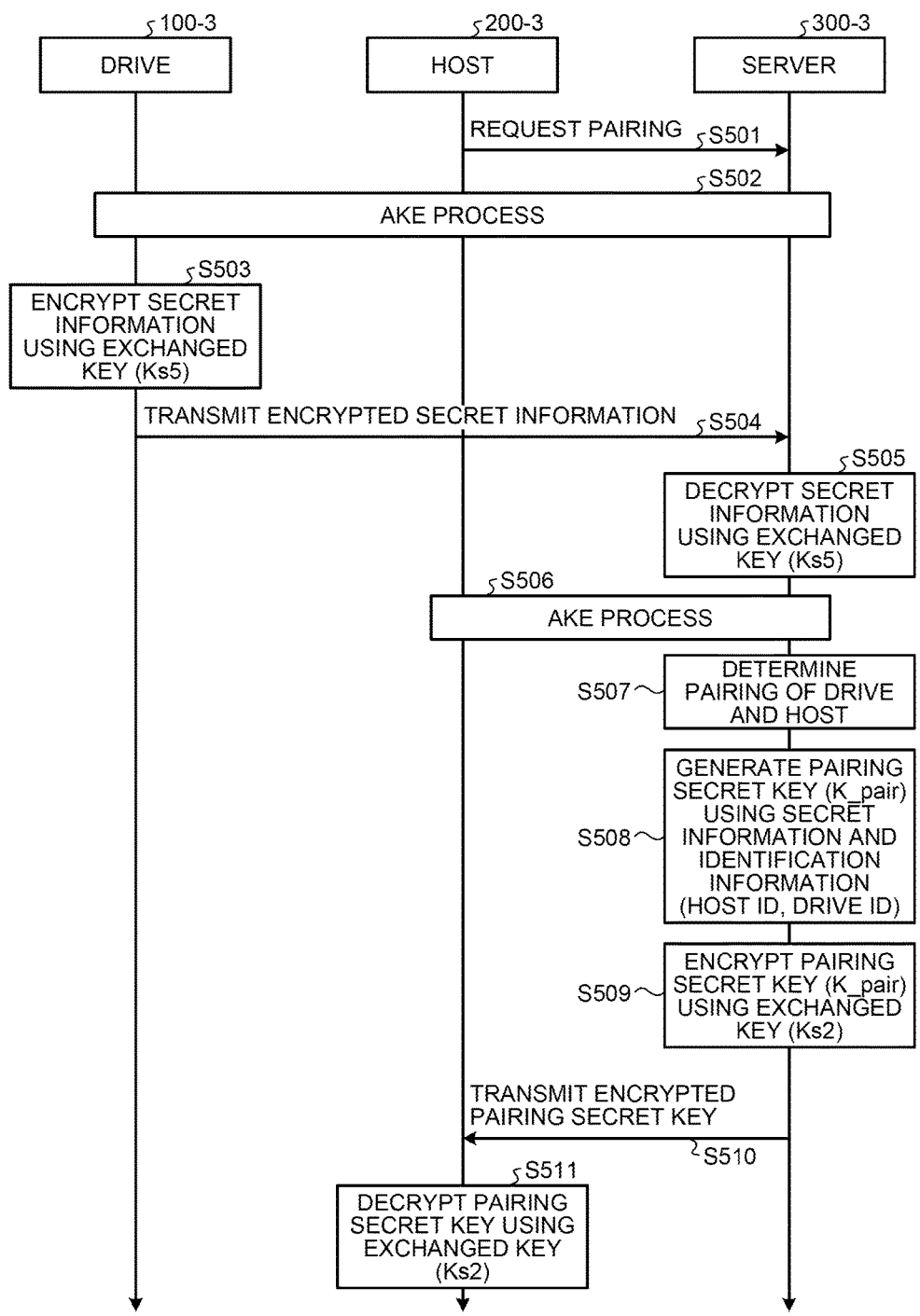
FIG. 8 is a flowchart of a secret information acquiring process according to the third embodiment.

Explained now with reference to FIG. 8 is a secret information acquiring process performed in the information processing system according to the third embodiment with the configuration described above. FIG. 8 is a flowchart illustrating an example of the secret information acquiring process according to the third embodiment.

Because the process from Step S501 to Step S507 is the same as that from Step S101 to Step S107 in the secret information acquiring process according to the first embodiment (FIG. 2), the explanation thereof is omitted herein.

If the combination is permitted, the cryptographic processor 303-3 in the server 300-3 generates a pairing secret key (K_pair) from the first secret information (Seed_pair), the host ID, and the drive ID (Step S508).

Because the process from Step S509 to Step S511 is the same as that from Step S309 to Step S311 in the secret information acquiring process according to the second embodiment (FIG. 5), the explanation thereof is omitted herein.

Once the preliminary process described above is completed, the host 200-3 can actually read the data from the recording medium 400 via the drive 100-3. The order at which the steps described above are executed is not limited to that illustrated in FIG. B, and the steps may be ordered differently, or those that can be executed in parallel may be performed in parallel (simultaneously).

Figure 9:
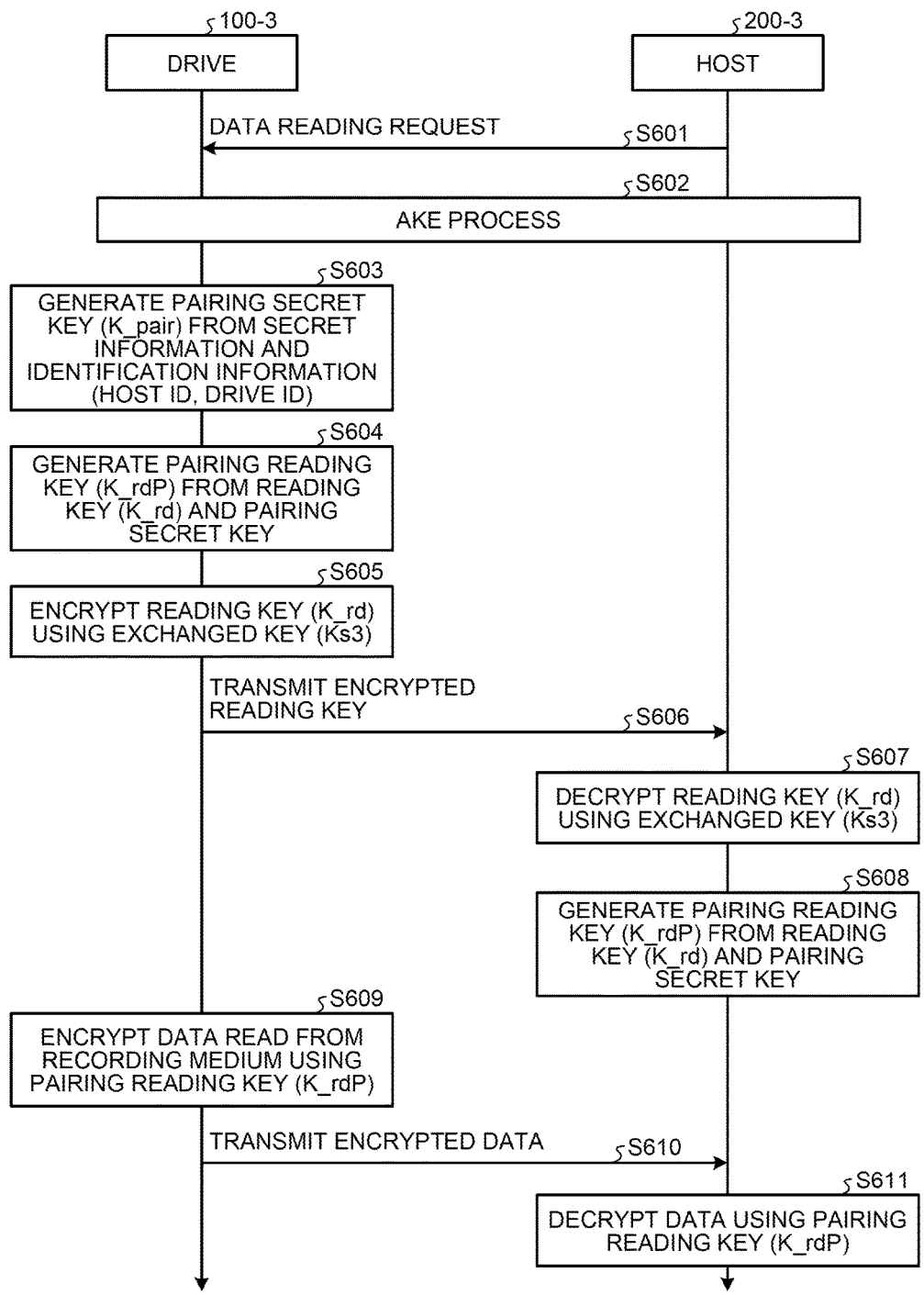
FIG. 9 is a flowchart of a reading process according to the third embodiment.

A reading process in which the data is read from the recording medium 400 via the drive 100-3 will now be explained. FIG. 9 is a flowchart illustrating an example of a reading process according to the third embodiment. The host 200-3 connects to the drive 100-3 pairing with which is required (not illustrated).

Because the process from Step S601 to Step S602 is similar to that from Step S201 to Step S202 in the reading process according to the first embodiment (FIG. 3), the explanation thereof is omitted herein.

The cryptographic processor 103-3 in the drive 100-3 generates a pairing secret key (K_pair) from the first secret information (Seed_pair), the host ID, and the drive ID (Step S603). The cryptographic processor 103-3 generates a pairing secret key at Step S603 following the same method as that used when the cryptographic processor 303-3 in the server 300-3 generates the pairing secret key at Step S508.

Because the process from Step S604 to Step S611 is the same as that from Step S404 to Step S411 in the reading process according to the second embodiment (FIG. 6), the explanation thereof is omitted herein.

Through the process described above, the host 200-3 reads the data in the recording medium 400 via the drive 100-3 recognized and permitted by the server 300-3. If no permission is received from the server 300-3, the host 200-3 cannot decrypt the encrypted data received from the drive 100-3. The order at which the steps described above are executed is not limited to that illustrated in FIG. 9, and the steps may be ordered differently, or those that can be executed in parallel may be performed in parallel (simultaneously).

Fourth Embodiment

In the third embodiment, data in the recording medium is encrypted using the pairing reading key (K_rdP) generated from the pairing secret key (K_pair) and the reading key (K_rd), and transmitted to the host from the drive. An information processing system according to a fourth embodiment verifies whether the host already has the correct pairing key (K_pair) in an AKE process performed between the drive and the host. Only when the information processing system verified that the host has the correct pairing key, it encrypts data in the recording medium using the reading key (K_rd) and transmits the encrypted data. In this configuration, the drive only has to encrypt the data in the recording medium always by using the same reading key (K_rd) regardless of which the host is connected, and only the host that has been permitted for combination by the server can correctly read data from the recording medium.

Figure 10:
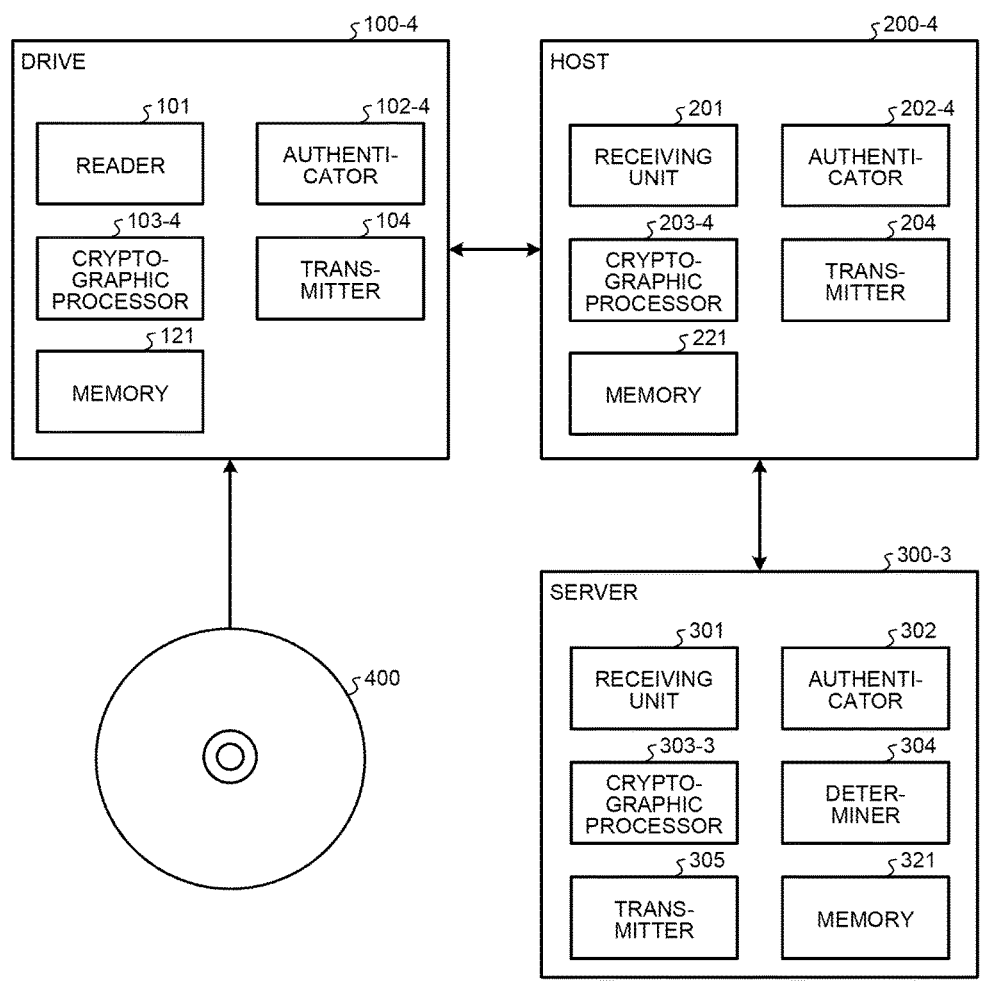
FIG. 10 is a block diagram of an information processing system according to a fourth embodiment.

FIG. 10 is a block diagram illustrating an example of a functional configuration of the information processing system according to the fourth embodiment. The information processing system according to the fourth embodiment includes a drive 100-4, a host 200-4, and a server 300-3.

In the fourth embodiment, a cryptographic processor 103-4 and an authenticator 102-4 in the drive, and a cryptographic processor 203-4 and an authenticator 202-4 in the host 200-4 are different from those in the third embodiment. The other elements and functions are the same as those illustrated in the block diagram of the information processing system according to the third embodiment in FIG. 7 and thus those elements are assigned with the same reference numerals, and explanations thereof are omitted herein.

The cryptographic processor 103-4 in the drive 100-4 is different from the cryptographic processor 103-3 according to the third embodiment in at least having the following function. The cryptographic processor 103-4 encrypts data in the recording medium using the reading key (K_rd) that is generated locally by the drive 100-4 or assigned in advance.

The cryptographic processor 203-4 in the host 200-4 is different from the cryptographic processor 203-3 according to the third embodiment in at least having the following function. The cryptographic processor 203-4 decrypts the encrypted data received from the drive 100-4, using the reading key.

The authenticator 202-4 in the host 200-4 is different from the authenticator 202 according to the third embodiment in at least having the following function. The authenticator 202-4 converts or encrypts all or part of messages for authentication to be transmitted to the drive 100-4 in the course of authentication processing, using the pairing key (K_pair) received from the server 300-3 in advance.

The authenticator 102-4 in the drive 100-4 is different from the authenticator 102 according to the third embodiment in at least having the following function. The authenticator 102-4 inverse-converts or decrypts, using the pairing key (K_pair), all or part of messages for authentication including a digital signature (Sig_RN2) received from the host 200-4 in the course of authentication processing, and then performs a verification process.

A secret information acquiring process performed by the information processing system according to the fourth embodiment with the configuration described above is the same as that in the third embodiment, and thus explanation thereof is omitted.

Figure 11:
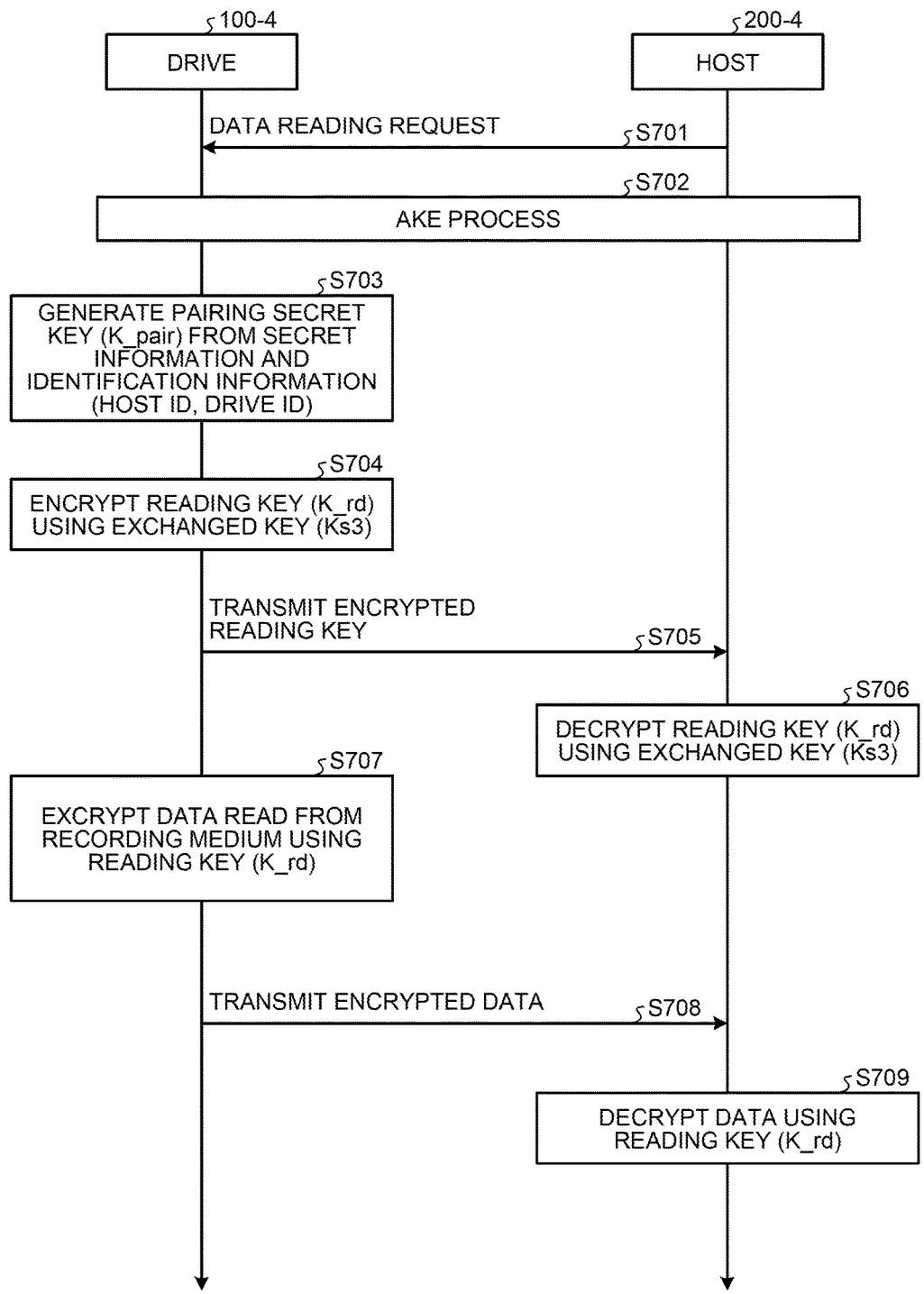
FIG. 11 is a flowchart of a reading process according to the fourth embodiment.

A reading process in which the data is read from the recording medium via the drive 100-4 will now be explained. FIG. 11 is a flowchart illustrating an example of a reading process according to the fourth embodiment. The host 200-4 connects to the drive 100-4 pairing with which is required.

The transmitter 204 in the host 200-4 transmits a data reading request to the drive 100-4 (Step S701). The authenticator 202-4 in the host 200-4 performs an AKE process including a verification process of the pairing key (K_pair) with the authenticator 102-4 in the drive 100-4 (Step S702). As a result of this AKE process, the drive 100-4 and the host 200-4 acquire a third shared key Ks3.

The cryptographic processor 103-4 in the drive 100-4 generates a pairing secret key (K_pair) from first secret information (Seed_pair), a host ID, and a drive ID (Step S703). The cryptographic processor 103-4 generates a pairing secret key at this step following the same method as that used when the cryptographic processor 302 in the server 300-3 generates a pairing secret key at a step (a step corresponding to S508 in FIG. 8).

The cryptographic processor 103-4 in the drive 100-4 encrypts a reading key (K_rd) using the third shared key Ks3 (Step S704). The transmitter 104 in the drive 100-4 then transmits the encrypted reading key to the host 200-4 (Step S705).

The cryptographic processor 203-4 in the host 200-4 acquires the reading key (K_rd) by decrypting the encrypted reading key using the third shared key Ks3 (Step S706).

The cryptographic processor 103-4 in the drive 100-4 encrypts the data read from the recording medium using the reading key (K_rd) (Step S707). The transmitter 104 then transmits the encrypted data to the host 200-4 (Step S708).

The cryptographic processor 203-4 in the host 200-4 acquires the data recorded in the recording medium by decrypting the encrypted data using the reading key (K_rd) generated locally by the cryptographic processor 203-4 and acquired at the above-described step.

Figure 12:
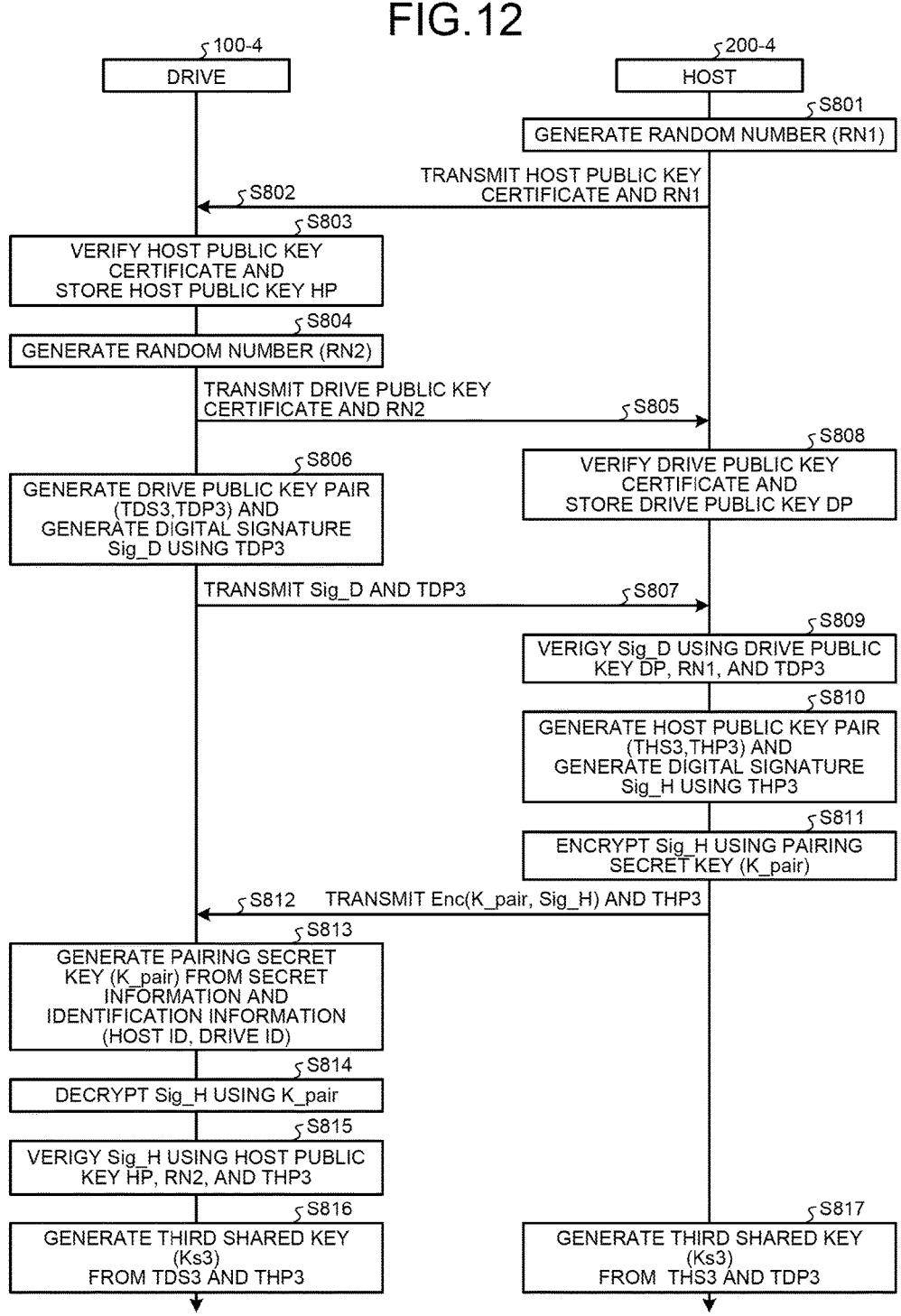
FIG. 12 is a flowchart of a AKE process according to the fourth embodiment.
Figure 13:
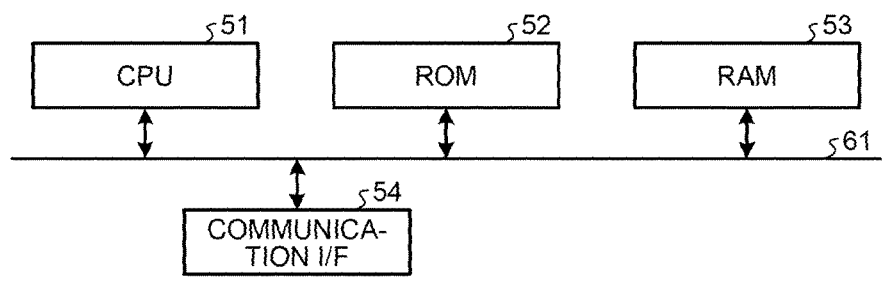
FIG. 13 is a schematic of a hardware configuration of the apparatuses according to the first to the fourth embodiments.

The AKE process for the drive 100-4 and the host 200-4 to share the third shared key Ks3 illustrated in FIG. 11 will now be explained. FIG. 12 is a flowchart illustrating an example of the AKE process for the drive 100-4 and the host 200-4 according to the fourth embodiment to share a shared key (Ks3). This AKE process is different from the AKE process in which the first or the second shared key is shared, in that this AKE process performs not only the sharing of a shared key but also performs at the same time a process for the drive to check whether the host has specific secret information (in this case, K_pair). For other processes, a typical AKE process can be used that uses public key cryptography in the same manner as an AKE process in which the first or the second shared key is shared.

In the AKE process in which the third shared key is shared, the host 200-4 generates a random number (RN1) for the AKE process (step S801) and transmits, to the drive 100-4, the random number with a host public key certificate (Cert_h) that is a unique certificate including a host public key (step S302).

The drive 100-4 verifies the validity of the received host public key certificate. When the drive 100-4 has verified the validity of the host public key certificate, the drive 100-4 retains the host public key (HP) included in the host public key certificate for a subsequent process (step S803). When the drive 100-4 has failed in verifying the validity, the drive 100-4 discontinues the AKE process and ends the pairing process.

Subsequently, the drive 100-4 generates a random number (RN2) for the AKE process (step S804) and transmits, to the host 200-4, the random number with a drive public key certificate (Cert_d) that is a unique certificate including a drive public key (step S805).

The drive 100-4 then generates a temporal drive public key pair (TDS3: temporal drive secret key, TDP3: temporal drive public key) for the AKE process, generates a drive digital signature (Sig_D=Sig (DS, RN1, TDP3)) using a drive secret key (DS) that is kept concealed and taking as input messages the random number (RN1) received from the host 200-4 and the temporal drive public key (step S806). The drive 100-4 transmits Sig_D and TDP3 to the host 200-4 (step S807).

The host 200-4 verifies the validity of the received drive public key certificate. When the host 200-4 has verified the validity of the drive public key certificate, the host 200-4 retains the drive public key (DP) included in the drive public key certificate for a subsequent process (step S808). When the host 200-4 has failed in verifying the validity, the host 200-4 discontinues the AKE process and ends the pairing process.

Subsequently, the host 200-4 verifies the received drive digital signature (Sig_D) using the drive public key (DP) verified at Step S808, the received temporal drive public key (TDP3), and the random number (RN1) generated locally by the host 200-4 (step S809). When the host 200-4 has failed in verifying the validity, the host 200-4 discontinues the AKE process and ends the pairing process.

The host 200-4 then generates a temporal host public key pair (THS3: temporal host secret key, THP3: temporal host public key) for the AKE process, and generates a host digital signature (Sig_H=Sig (HS, RN2, THP3)) using the temporal host secret key and taking as input messages the random number (RN2) received from the drive 100-4 and the temporal host public key (THP3) (step S810). In addition, the host 200-4 encrypts Sig_H using the pairing secret key (K_pair) (step S811). The host 200-4 transmits, to the drive 100-4, THP3 and the encrypted host digital signature (Enc (K_pair, Sig_H)) (Step S812).

The drive 100-4 generates the pairing secret key (K_pair) from the first secret information (Seed_pair), the host ID, and the drive ID (step S813). The drive 100-4 decrypts the received encrypted host digital signature (Enc(K_pair, Sig_H)) using the pairing secret key (K_pair), and obtains Sig_H (step S814).

Subsequently, the drive 100-4 verifies the received host digital signature (Sig_H) using the host public key (HP) verified at Step S803, the received temporal host public key (THP3), and the random number (RN2) generated locally by the drive 100-4 (step S815). When the drive 100-4 has failed in verifying the validity, the drive 100-4 discontinues the AKE process and ends the pairing process.

In addition, the drive 100-4 generates a third shared key from the temporal drive secret key (TDS3) generated at Step S806 and the temporal host public key (THP3) received at Step S812 (step S816).

The host 200-4 generates the third sharing key from the temporal drive public key (TDP3) received at Step S807 and the temporal host secret key (THS3) generated at Step S810 (step S317).

By the above-described processes, the host 200-4 and the drive 100-4 can provide the same third shared key if the host 200-4 has received in advance a pairing secret key (K_pair) from the server 300-3. By performing the above-described reading process illustrated in FIG. 11, the host 200-4 can read the data from the recording medium via the drive 100-4 recognized and permitted for pairing by the server 300-3. If a permission has not been obtained from the server 300-3, the drive 100-4 fails in verifying the host digital signature (Sig_H) and ends the pairing process. Thus, the host 200-4 cannot perform the reading process illustrated in FIG. 11.

As described above, according to the first to the fourth embodiments, pairing between a reading apparatus (e.g., a drive) and an information processing apparatus (e.g., a host) actually decrypting the read data can be managed using a server apparatus. It is therefore possible to prevent any illegitimate host from reading the data before such an illegitimate action actually takes place.

A hardware configuration of the apparatuses according to the first to the third embodiments (the reading apparatus, the information processing apparatus, and the server apparatus) will now be explained with reference to FIG. 10. FIG. 10 is a schematic for explaining an example of the hardware configuration of the apparatuses according to the first to the third embodiments.

Illustrated in FIG. 10 are main components that are common among the apparatuses, but each of the apparatuses may also include other components required for processes that are specific to the apparatus. For example, a drive (reading apparatus) reading data from a DVD or BD may also include an optical system for emitting light, and a circuit for controlling the optical system.

The apparatuses according to the first to the fourth embodiments include a controller such as a central processing unit (CPU) 51, a storage device such as a read-only memory (ROM) 52 and a RAM 53, a communication interface (I/F) 54 communicating with the external, and a bus 61 connecting these devices to one another.

The computer program executed on the corresponding apparatus according to the first to the third embodiments is provided incorporated in the ROM 52 or the like in advance.

The computer program executed on the corresponding apparatus according to the first to the third embodiments may be provided as a computer program product, in a manner recorded in a computer-readable recording medium such as a compact disc read-only memory (CD-ROM), a flexible disk (FD), compact disc recordable (CD-R), or a digital versatile disc (DVD), as a file in an installable or executable format.

The computer program executed on the corresponding apparatus according to the first to the third embodiments may also be stored in a computer connected to a network such as the Internet, and made available for download over the network. The computer program executed on the corresponding apparatus according to the first to the third embodiments may also be provided or distributed over a network such as the Internet.

The computer program executed on the corresponding apparatus according to the first to the third embodiments can cause a computer to function as the units included in the apparatus. In the computer, the CPU 51 can read the computer program from a computer-readable storage medium onto a main memory, and execute the computer program.

Each of the units included in the apparatuses may be implemented by causing a processor such as the CPU 51 to execute the computer program, that is, as software, or may be implemented as hardware such as an integrated circuit (IC), or a combination of the software and the hardware.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system comprising:
   a reading apparatus;
   an information processing apparatus; and
   a server apparatus,
   the reading apparatus comprising processing circuitry configured to operate as:
      a first authenticator configured to acquire a first shared key by performing a first authentication/key exchanging process with the server apparatus;
      a first cryptographic processor configured to acquire first secret information and encrypt the first secret information using the first shared key;
      a first transmitter configured to transmit the encrypted first secret information to the server apparatus; and
      a reader configured to read data from a recording medium, the server apparatus comprising processing circuitry configured to operate as:
      a second authenticator configured to acquire the first shared key by performing the first authentication/key exchanging process with the reading apparatus, and to acquire a second shared key by performing a second authentication/key exchanging process with the information processing apparatus;
      a first receiver configured to receive the encrypted first secret information from the reading apparatus;
      a second cryptographic processor configured to decrypt the encrypted first secret information with the acquired first shared key, and to encrypt second secret information that is based on the decrypted first secret information with the second shared key;
      a determiner configured to determine whether to permit the information processing apparatus to acquire the data read from the recording medium by the reading apparatus for legitimate use of the data; and
      a second transmitter configured to transmit the encrypted second secret information to the information processing apparatus when the determiner determines to permit, and
   the information processing apparatus comprising processing circuitry configured to operate as:
      a third authenticator configured to acquire the second shared key by performing the second authentication/key exchanging process with the server apparatus;
      a second receiver configured to receive the encrypted second secret information from the server apparatus; and
      a third cryptographic processor configured to decrypt the encrypted second secret information using the second shared key.

2. The system according to claim 1, wherein the second cryptographic processor is configured to encrypt the decrypted first secret information as the second secret information using the second shared key.

3. The system according to claim 1, wherein the second cryptographic processor is configured to encrypt the second secret information that is generated based on the decrypted first secret information and identification information of the information processing apparatus, using the second shared key.

4. The system according to claim 1, wherein the second cryptographic processor is configured to encrypt the second secret information that is generated based on the decrypted first secret information, identification information of the information processing apparatus, and identification information of the reading apparatus, using the second shared key.

5. The system according to claim 1, wherein
   the first authenticator is further configured to acquire a third shared key by performing a third authentication/key exchanging process with the information processing apparatus;
   the first cryptographic processor is further configured to generate an encryption key based on a reading key and the second secret information, to encrypt the read data using the generated encryption key, and to encrypt the reading key using the third shared key;
   the first transmitter is further configured to transmit the encrypted reading key and the encrypted data to the information processing apparatus;
   the third authenticator is further configured to acquire the third shared key by performing the third authentication/key exchanging process with the reading apparatus;
   the second receiver is further configured to receive the encrypted reading key and the encrypted data from the reading apparatus; and
   the third cryptographic processor is further configured to decrypt the reading key using the third shared key, to generate the encryption key based on the decrypted reading key and the second secret information, and to decrypt the encrypted data using the generated encryption key.

6. The system according to claim 5, wherein the first cryptographic processor is configured to generate the reading key using at least one of identification information of the information processing apparatus and identification information of the reading apparatus.

7. An information processing method executed In an information processing system that comprises a reading apparatus, an information processing apparatus, and a server apparatus, the method comprising:
   acquiring, by the reading apparatus, a first shared key by performing a first authentication/key exchanging process with the server apparatus;
   acquiring, by the reading apparatus, first secret information;
   encrypting, by the reading apparatus, the first secret information using the first shared key;
   transmitting, by the reading apparatus, the encrypted first secret information to the server apparatus;
   receiving, by the server apparatus, the encrypted first secret information from the reading apparatus;
   reading, by the reading apparatus, data from a recording medium;

acquiring, by the server apparatus, a second shared key by performing a second authentication/key exchanging process with the information processing apparatus;

decrypting, by the server apparatus, the encrypted first secret information using the acquired first shared key;

encrypting, by the server apparatus, second secret information that is based on the decrypted first secret information with the second shared key;

determining, by the server apparatus, whether to permit the information processing apparatus to acquire the data read from the recording medium by the reading apparatus for legitimate use of the data;

transmitting, by the server apparatus, the encrypted second secret information to the information processing apparatus when the server apparatus determines to permit;

receiving, by the information processing apparatus, the encrypted second secret information from the server apparatus; and decrypting, by the information processing apparatus, the encrypted second secret information using the second shared key.

\* \* \* \* \*